Sept. 15, 1970        M. H. BROWN        3,528,890
DISTILLATION OF SALINE WATER TO RECOVER FRESH WATER
Filed Aug. 10, 1966        4 Sheets-Sheet 2
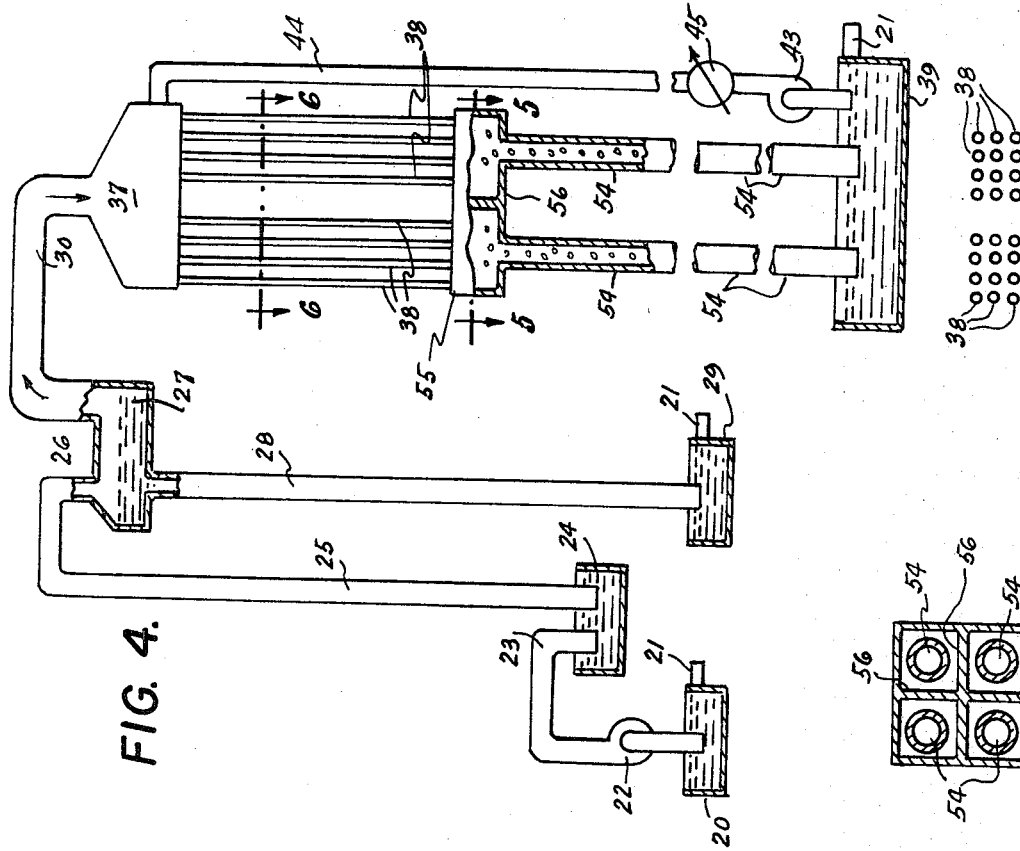
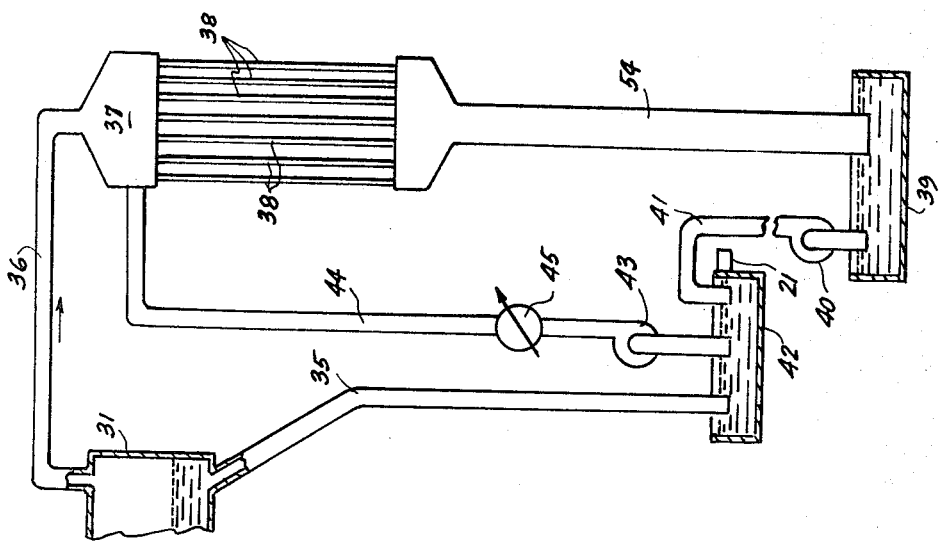
INVENTOR.
MELVIN H. BROWN
BY
ATTORNEY

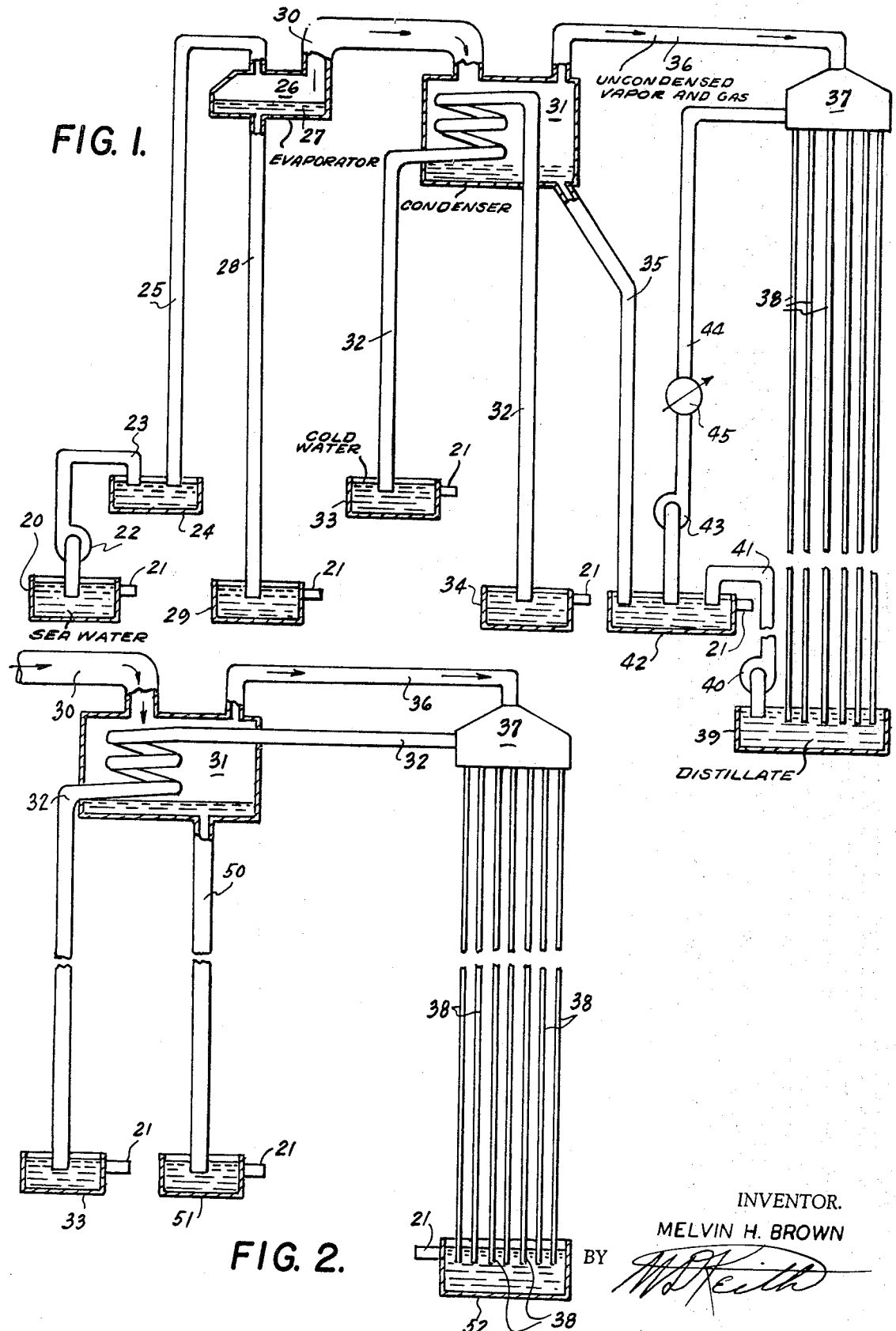

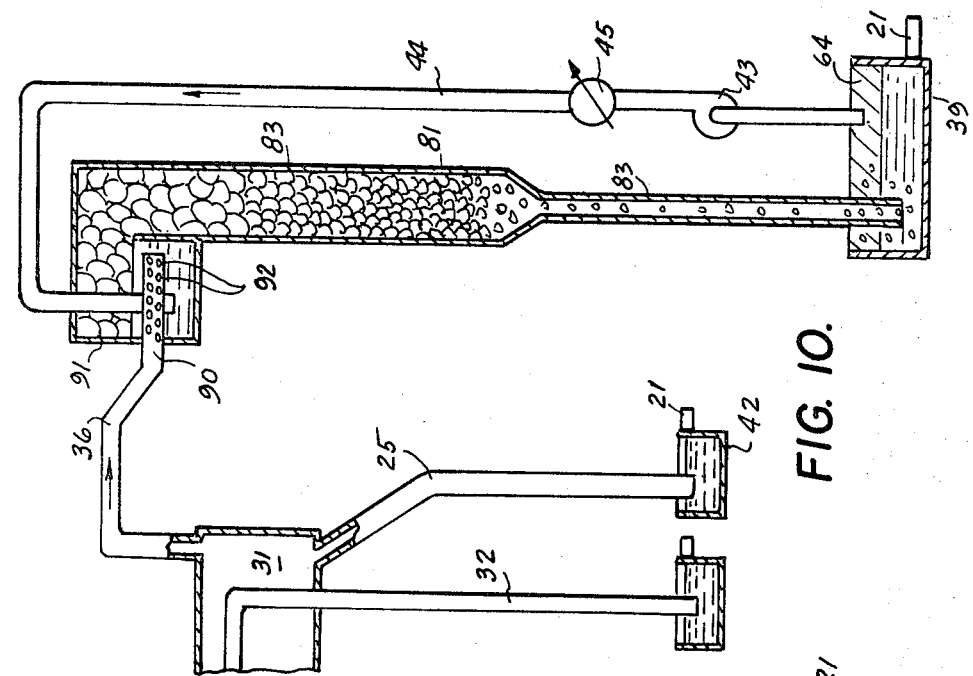
FIG. 10.
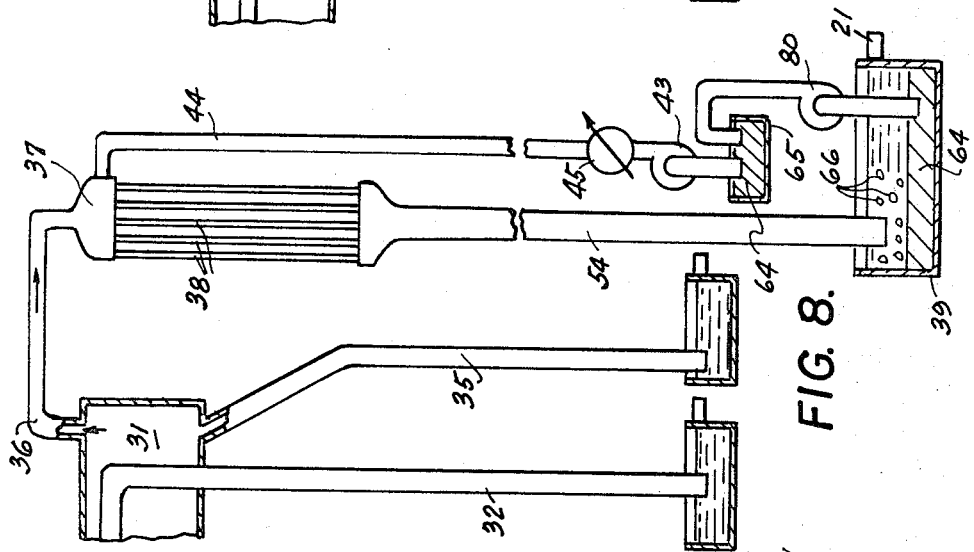
FIG. 8.
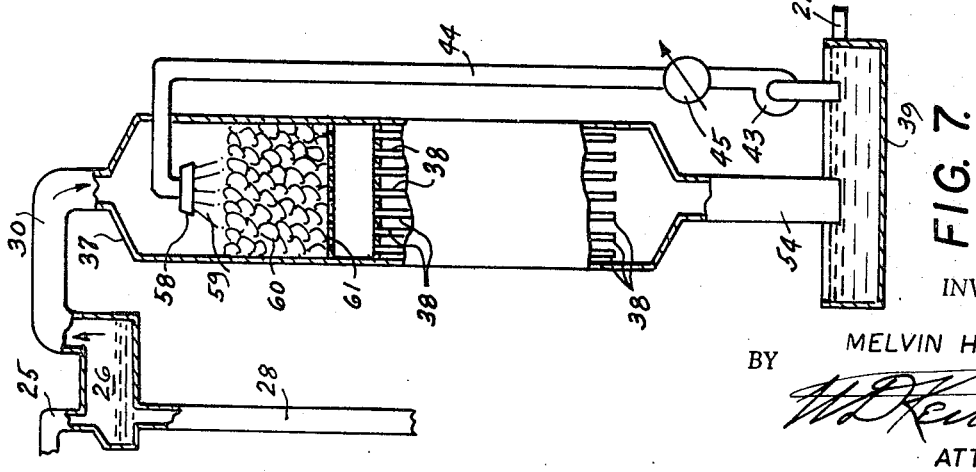
FIG. 7.
INVENTOR.
MELVIN H. BROWN
BY
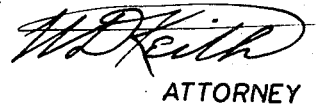
ATTORNEY Sept. 15, 1970  M. H. BROWN  3,528,890
DISTILLATION OF SALINE WATER TO RECOVER FRESH WATER
Filed Aug. 10, 1966  4 Sheets-Sheet 4
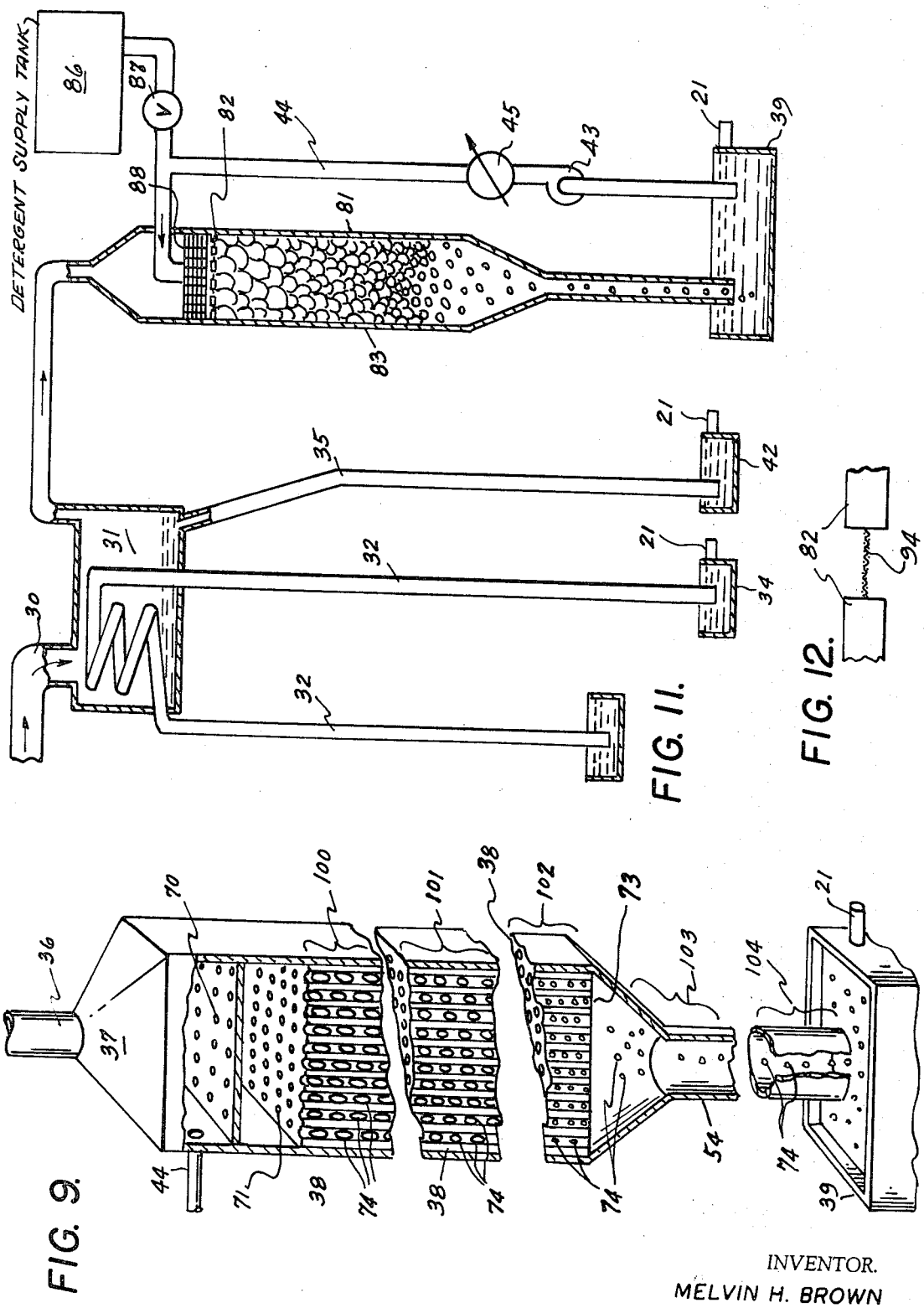

United States Patent Office 3,528,890
Patented Sept. 15, 1970

3,528,890
DISTILLATION OF SALINE WATER TO
RECOVER FRESH WATER
Melvin Henry Brown, Leechburg, Pa., assignor to Aluminum Company of America, Pittsburgh, Pa., a corporation of Pennsylvania
Filed Aug. 10, 1966, Ser. No. 571,514
Int. Cl. B01d 1/28; C02b 1/06
U.S. Cl. 203—4          3 Claims

ABSTRACT OF THE DISCLOSURE

Method of purifying water, such as sea water, by low temperature evaporation thereof under conditions of reduced pressure to produce a gaseous mixture of water vapor and non-condensible gas and, subsequent to substantial condensation of the water vapor, encapsulation of the remaining uncondensed water vapor and the non-condensible gases in a downwardly flowing vertical column of encapsulating liquid.

---

This invention relates to purification methods by which a saline water, which also contains a non-condensible gaseous component, is treated to lower its chemical content to a level tolerable to the intended purpose which may be industrial in nature, the provision of water for irrigation, the provision of water for comsumption by humans or animals, or other purpose. Sea water and brackish water are outstanding examples of saline waters which contain chemicals, contain non-condensible gas, and which usually require some purification. The general object of this invention is to purify such waters while overcoming difficulties inherent from the presence in the water of such non-condensible gaseous components as absorbed air, products of organic or inorganic reactions, or the like. Various approaches to the purification of such waters are known, including those which initially vaporize the water to effect the separation of water from chemical. The present invention offers advantages economically over many other processes particularly where purification of large volumes of water is effected through vaporization.

In the practice of the methods of this invention the saline water presented for treatment is evaporated at less than atmospheric pressure thereby producing, continuously over any given time period, a gaseous mixture containing water vapor as an essential component and non-condensible gas as an unavoidable component. As this gas mixture is produced it is subjected to a condensing step during which a recovery of a substantial portion of the water vapor content of the gaseous mixture is effected to obtain at least part of the purified product desired. As will appear, this condensing step may be the only step in which recovery of purified water is achieved; but usually I also prefer to effect further condensation during the gas removal step which follows the condensation step. In general, I prefer to condense prior to encapsulation of the gaseous mixture about 60 to about 95 percent or even greater by weight of the water vapor content of the gaseous mixture formed by the evaporation, since this will usually ensure optimum over-all economies in the operation of the method of the invention.

After this condensation is effected the remainder of the gas mixture is encapsulated, continuously over the period of its availability, in a liquid in the upper extremities of a plurality of elongate, substantially vertical chambers to form encapsulated gas bodies which at the time of encapsulation are substantially equal in horizontal cross sectional area and dimension to the horizontal cross section of the chamber in which the body is formed. After formation in the upper extremity of a vertical chamber each body thus encapsulated is moved downwardly and compressed in the chamber by the formation above it of further encapsulated bodies. As the result of this continuous encapsulation in liquid of bodies of the gas mixture and the compression and downward movement of the encapsulated bodies in the vertical chambers and their eventual release from the lower extremities thereof, the necessary maintenance of pressure in the system at the desired sub-atmospheric level is achieved.

The encapsulating liquid may vary in nature subject to the usual limitations as to toxicity, odor, and the like attendant upon the use to which any condensable portion of the gas mixture may be put and subject, further, to such viscosity requirements as will promote flow in the vertical chambers at the desired rate, all as hereinafter discussed.

The term "encapsulated" and its variants as used herein are used to convey the fact that bodies of the gas mixture are at least partially defined and surrounded by a liquid phase. To avoid implications arising from specialized use of such terms in botanical, physiological and other arts, the terms are herein defined as used in the derivative sense of little chest or box. As will appear, the wall or media which defines the capsule of gas mixture is necessarily essentially liquid to provide flexibility under compression in the vertical chamber, but initially, at least, a portion of the capsule wall may be defined by the wall of the vertical chamber.

The invention is procedural in character and does not contemplate any particular apparatus within its scope. For purposes of illustration and description of the invention reference will be had to the accompanying drawings which schematically indicate general arrangements of parts and mechanisms grouped to apply the methods of the invention in various ways. In these drawings like numerals designate like parts.

FIG. 1 illustrates partly in elevation and partly in section one plan of operation of the invention wherein two separate condensing operations take place and in which the condensate is used as encapsulating liquid;

FIG. 2 illustrates partly in elevation and partly in section a plan of operation somewhat similar to that shown in FIG. 1 except that the product of the second condensation is sent to waste and an impure water, used as the coolant in the first condensation, is used as encapsulating liquid;

FIG. 3 illustrates a modification of FIG. 1 wherein the elongate chambers 38 are shortened and delivered into a confined vertical common stream;

FIG. 4 illustrates partly in elevation and partly in section another plan of operation of the invention in which only one condensing step is employed and the encapsulating liqiud is the coolant and the recirculated product of the condensation;

FIG. 5 is a view taken as indicated in FIG. 4, at line 5—5, through a part of the condensing apparatus;

FIG. 6 is a view taken as indicated in FIG. 4 at line 6—6 through other parts of said condensing apparatus;

FIG. 7 illustrates, largely in section, another plan of operation of the invention which is, essentially, a modification of that illustrated in FIG. 4;

FIG. 8 illustrates, partly in section and partly in elevation, modification of the plan of operation illustrated in figures of lower number to the use of immiscible encapsulating liquid;

FIG. 9 illustrates the operation of encapsulating, compressing, and condensation steps used in the practice of the methods of water purification which embody the present invention;

FIG. 10 illustrates, largely in section, another method of practicing the invention in which encapsulation of the gas mixture is by foaming the gas and compressing the foamed gas while condensing its condensible portion, the plan of operation shown being, otherwise, that shown in FIG. 8; and FIG. 11 is a view, largely in section, of a modification of the operational plan illustrated in FIG. 1, the encapsulating of the gas mixture being accomplished by foaming.

FIG. 12 is an enlarged view of a portion of FIG. 11.

Referring to FIG. 1, the system shown involves evaporator 26, a first condenser 31, and a plurality of vertical chambers or column formers 38. The water to be purified is lifted from a source 20 by pump 22 through pipe 23 to take 24 from whench it is lifted through leg 25 to the evaporator 26 where a portion is evaporated to form a gas mixture of water vapor and non-condensible gas which passes through passage 30 to condenser 31. The action in the vertical chambers 38 helps to furnish the vacuum which lifts the water through leg 25, lowers the pressure in the evaporator and induces the flow of the gas mixture formed on evaporation. Unevaporated water collects in the bottom of evaporator 26 and from thence flows to waste through leg 28, basin 29 and its overflow pipe 21. Such heat as may be added to the water can conveniently be added at basin 24. Cool water flowing from source 33 through coil pipe 32 to outlet tank 34 causes condensing of part of the water vapor to obtain purified water which collects in the bottom of the condenser and passes therefrom through leg 35 into distillate basin 42 from whence it flows through an overflow 21 to the ultimate collection point. The uncondensed portion of the gas mixture flows through passage 36 to the distributing head 37 of a collection of a plurality of vertical chambers 38 which may be formed of tubes of any cross-sectional shape, but preferably round. The encapsulating liquid, in this case the distillate contained in distillate basin 42, is brought to the distributing head 37 through tube 44 and its heat exchanger 45 under the action of pump 43. In distributor head 37 the distillate flows from pipe 44 onto a perforate distribution plate 70, and example of which is shown in FIG. 9, and thence down upon the sheet 71 through which open the upper extremities of the vertical chambers 38. The gas mixture flowing into distribution head 37 and around distribution plate 70 enters the opening into the upper extremity of vertical chambers 38 and is there encapsulated, by the distillate flowing in said head, into somewhat elongate gas slugs the horizontal cross-section of which correspond in area and dimension to the horizontal cross-section of the chamber in which they are formed. After each gas body or slug is encapsulated it is forced downwardly by the weight of the succeeding encapsulated body in that chamber and is also by that weight compressed. As encapsulation in a chamber progresses the encapsulated body is further compressed while portions thereof which are condensible may also be condensed. Also, portions of the encapsulated body may be dissolved in the encapsulating liquid. Eventually, each encapsulated body of the gas mixture arrives in its downward movement at the exit of the chamber where the remaining gas leaves the chamber and exits through distillate tank 39 to the atmosphere. The encapsulating liquid, plus any distillate condensed from the gas mixture, flows into distillate tank 39 and from thence through pump 40 to tank 42. In the operation illustrated in FIG. 1 a transfer pipe 41 and pump 40 is provided to transfer from distillate tank 39 to tank 42. The removal of the gas mixture from the system through the elongate chambers 38 is continuous and positive and maintains a less than atmospheric pressure in the system at equilibrium conditions which are the function of the rate of evaporation, density and temperature of the encapsulating liquid, and the length and number of the vertical chambers 38. The plan of operation illustrated in FIG. 1 contemplates a recovery in two condensation steps, one at condenser 31 and one in vertical chambers 38. For the latter purpose the temperature of the encapsulating liquid and of the chambers 38 is maintained at a temperature below the condensing point of the condensible water vapor in the encapsulating gas mixture. In the specific system illustrated, proper temperature control can be accomplished by use of any liquid cooling means located at 45.

Where comparative purity factors will tolerate it, the system shown in FIG. 1 can be modified to the plan of operation shown in FIG. 2 wherein the coil pipe 32, used to bring coolant to the condenser 31, can be rearranged to feed encapsulating liquid to the header 37. The liquid flowing from the lower end of the vertical chambers 38 is received in a basin 52, maintained at chamber sealing level by overflow pipe 21, and the overflow sent to waste. Purified water is, therefore, only recovered at condenser 31 and flows through leg 50 to distillate basin 51 and through overflow pipe 21 to a proper collection point.

In the plans of operation illustrated in FIGS. 1 and 2, a vertical chamber 38 having a circular cross-section of one-fourth inch diameter would for best results have a length of about 45 feet if water, whether pure or impure, is used as the encapsulating liquid. While there is nothing impractical in such a situation, a more preferred manner of handling the length of vertical chamber desired is illustrated in the modification of FIG. 3. In FIG. 3 the plan of operation shown is that of FIG. 1 previously described with the exception that the vertical chambers 38 are shortened to terminate in a single vertical chamber 54. Thus the effective height of the vertical chamber, considered in total, is not changed from whatever is chosen as the preferred height, but the multiplicity of chambers 38 is eliminated at a point after the cross-sectional dimensions of most of the encapsulated gas bodies has become less than that of the chambers 38. The situation just generally described is shown more specifically in FIG. 9. Referring to FIG. 9 in the initial reaches of chambers 38, as illustrated at area 100, the initially formed bodies of the gaseous mixture are somewhat elongate, as shown at 74, and have, as previously stated, a horizontal cross-sectional area equal in area and dimension to the similar cross-section of the chamber 38. As the bodies 74 pass downwardly in the chambers 38 under the compression and downward gravitational force of similar bodies encapsulated in the chambers 38 at points above, the bodies tend to become circular in cross-section, as indicated at 74 at area 101 of said chambers 38. Finally, as compression of these bodies contninues, the bodies largely diminish in horizontal cross-sectional area so that they become gas bubbles surrounded by a stream of encapsulating liquid, plus, of course, any liquid which may be the result of condensation of the condensible portions of the encapsulated gas mixture. The result becomes that illustrated at 74 in the area 102 indicated in FIG. 9. It is at about this point that we prefer to release the compressed bodies of gaseous mixture from at least some of the chambers 38 to a confined common stream defined by a single channel 54, thus creating the situation shown at areas 103 and 104 of FIG. 9. This common channel 54 into which the effluent of chambers 38 eventually merge represents a confined common stream which is maintained at a flow velocity sufficient to cause movement of the condensed encapsulated bodies 74 away from their point of delivery from chambers 38 to said common stream and, eventually, to the distillate reservoir 39 at which point the remaining bodies 74, now perhaps composed essentially of non-condensible gas, are released into the atmosphere through the seal formed by reservoir 39.

A further modification of FIG. 1 is illustrated in FIG. 4, and in a somewhat different plan in FIG. 5. The general principle of this modification is that the step of condensing a portion of the water vapor from the gas mixture before encapsulating said gas mixture is at least partially eliminated and substantially all, or most condensation of water vapor is effected after the gas mixture has been encapsulated. In this modification of the process the temperature of the encapsulating liquid, and of the walls of the elongate substantially vertical chambers, is held at a level to effect substantial condensation of the water vapor of the gas mixture as encapsulated bodies thereof travel downwardly in the elongate chambers 38 to the point where the then uncondensed and the uncondensable portions of the gas mixture are released, either at the lower extremities of such chambers or at the lower extremities of a confined common stream into which the elongate vertical chambers may exit. Such a modification of the preferred method of the invention may be useful in some cases, although the total chamber area of the vertical chambers may need to be enlarged. The modification is illustrated by the plan of operation shown in FIG. 4. By comparison with figures bearing lower numbers it will be seen that the preliminary or first condensing area 31 has been eliminated. The gas mixture from the evaporator 26 passes directly to a header 37 which, in the manner indicated in the upper portion of FIG. 9, feeds the gas mixture and the encalsulating liquid from line 44 into the upper extremities of four groups of elongate vertical chambers 38, shown in cross-section 6—6, at FIG. 6, which chambers, in the manner previously described, merge into four common streams defined by vertical chambers 54, shown in cross-section 5—5, at FIG. 5, which chambers 54 terminate in, and are sealed by, the distillate chamber 39 which delivers the condensed purified water distillate to a desired point through overflow pipe 21. In such a plan of operation the encapsulating liquid must either be immiscible with the condensed water vapor or, if it be water, a water of a purity which does not by admixture lower the total purity of distillate plus encapsulating water to a point intolerable under the prevailing requirements. In the modified plan of operation shown in FIG. 4 the encapsulating liquid is the condensed water vapor distillate fed from the distillate receptacle 39 through pipe 44, with the assistance of pump 43, to the header 37. In such modification of the method of the invention the temperature of the encapsulating liquid and of vertical chambers 38 and common stream formers 54 must be such as to insure substantial condensation of the water vapor component of the gas mixture and for this purpose a heat exchanger 45 is provided in line 44 to control the temperature of the encapsulating liquid. In this modification, as in plans of operation previously and hereinafter discussed, further condensation temperature control in vertical chambers 38 and common streams 54 may be effected by cooling the walls of said chambers or of the pipes defining common streams below said chambers.

Another illustration of the operation generally described with reference to FIG. 5 is shown in FIG. 7. Here the efficiency of the condensing action of vertical chambers 38 and the common stream 54 is increased by providing in the header chamber 37 the packing 60 which is rested on perforate plate 61, to provide additional surface area and impede time of flow, and over which is sprayed, as from spray head 58, recycled distillate 59 from pipe 44. The effect is to preliminarily condense a part of the water component of the gas mixture from evaporator 26. The product of this condensation and the recycled distillate from spray 59 furnish the encapsulating liquid for the vertical chambers 38.

The cross-sectional shape of the vertical chambers in which encapsulating is initially accomplished may vary from a circle to a square, may be a quadrant or a half of a circle, or may be triangular or of similar shape. The cross-sectional shape is not critical to the obtainment of the results hereinabove discussed. The preferred cross-sectional shape of the chambers is circular, oblate, or approaching a circle, since such lend themselves to the ready formation of the encapsulated bodies of gas. The area of the cross-section of the vertical chambers has practical limits readily ascertained for any particular cross-sectional shape and any particular encapsulation liquid. The length of the column formed by a vertical chamber, and its attendant common stream chamber if one be used, will vary with the vacuum desired in the operation and the weight of the encapsulating liquid. For instance, where water is used as the encapsulating liquid, column lengths of up to 60 feet are desirable; but if mercury is used as the encapsulating liquid the same general results may be obtained by use of column lengths of 3 to 5 feet. Where mercury or other water-immiscible encapsulating liquids are used, the liquid is recirculated. Such a plan of operation is shown in FIG. 8, which illustrates a modification of the operations generally described with reference to FIGS. 1, 2 and 3. In this modification the source of the immiscible liquid 64, which is indicated in the drawings as heavier than water but may be the opposite, is the added reservoir 65 from which it is lifted to pump 43 through tube 55 to encapsulating position. When the encapsulated gas bodies, and the condensate of the water vapor, is delivered to basin 39 the immiscible liquid 64 separates in basin 39 from where it is transferred by means of pump 80 to the reservoir 65 for further use. Heat exchangers 45, or other cooling devices, are operated when desirable to maintain temperature within the vertical columns to effect the desired condensation of water vapor from the gas mixture.

In some instances it may be useful to use the variants of the methods of this invention which are indicated in FIGS. 10 and 11, each showing a plan of operation such as generally described with reference to FIG. 1.

The plans of operation indicated in FIGS. 10 and 11 vary from plans previously described herein in that encapsulation of the gas mixture is by way of foaming. In FIG. 10 the encapsulating liquid is an immiscible foaming oil 64. A single vertical column 81 is provided in any suitable cross-sectional shape and area. As shown, the cross-sectional area of this column may be reduced in its lower reaches since the encapsulated gas mixture will become compressed at these lower points. In the operation illustrated in FIG. 10 the foaming oil 64 is delivered in through pine 44 by the action of pump 43 to oil bath 91. The gas mixture from condenser 31 flows through pipe 36 to the perforated end thereof 90 from which it is delivered, through perforations 92, to and through the oil bath to form foam 83 which fills column 81. This foam is composed of the gas mixture surrounded by the oil film and as further foam is formed the first-formed foam travels downwardly and is compressed in the column former 81. Simultaneously, the water vapor in the foamed gas mixture may be partially condensed. The compressed downwardly traveling foam exits from the lower end of column former 81 into the receiving, and column sealing, basin 39 where uncondensed water vapor and gaseous uncondensibles are released to atmosphere and the distillate is separated from the immiscible oil. In the operation illustrated in FIG. 11 water which contains a foaming agent, such as a foam-promoting detergent, is used as the encapsulating liquid and is recycled, additional foaming agent being added to the recycled water as dilution due to condensation may require. Referring to FIG. 11, water from distillate chamber or reservoir 39 is raised by pump 43 through pipe 44 to the top of the vertical column 81 such cooling as may be required being furnished at heat exchanger 45. This will, of course, contain some foaming agent which is supplemented, as desired, by valving detergent from supply tank 86 through valve 87 into the water. This recirculated water, containing adequate foaming agent, is released onto a bed of packing, or the like, such as the illustrated mat of screen 88 which rests on perforate plate 82 and there it encounters the gas mixture flowing from condenser 31 and encapsulates the gas in foam 83, which foam enters the column former 81 where is is compressed by the weight of the constantly added newly-formed foam and eventually flows downwardly into the basin 39 where any uncondensed water vapor and the gaseous uncondensibles are released to the atmosphere. Preferably the perforations in plate 82 are bridged by a screen, such as a number 40 mesh wire screen, as illustrated at 92 in FIG. 12.

The vertical chambers 38, as illustrated in the schematic drawings attached hereto, are conveniently shown as straight tubes. This is not a necessary condition. The chamber, or column former 38, must, to obtain compressive effect, have an over-all vertical component but this may be achieved in a helical, curved or serpentine column. The exact altitude or shape of these chambers or column formers is of no consequence so long as a component generally vertical to the earth exerts a downward compressive thrust by reason of the gravitational force of the capsuled gas mixture and its encapsulating liquid. The effective over-all length of the chambers, in the preferred aspects of the invention, is so selected with respect to the temperature and the velocity of flow of the liquid therein as to cause adjacent the lower extremity of said chambers a ratio of volume of encapsulated gas to volume of encapsulating liquid of not greater than 1.5 and, usually, between about 0.05 and 1.5.

The receiving basins or delivery basins or reservoirs indicated at 29, 33, 34, 39, 42, 51 and 52 in the accompanying drawings are also sealing means for the legs or pipes extending into them, therefore to maintain, in the manner the liquid in the leg of a barometer is maintained, the liquid in said legs. The height of the legs will, of course, be adjusted in accordance with known principles to this end. The extent to which pumps are used to lift, or assist in the lift or transfer of liquid will, as usual in the art, be dictated by need and by the cost of pumping power at the site of the practice of the invention.

The encapsulation of the gas mixture at the upper extremity of the vertical chambers 38 may be accomplished in various specific ways which form no part of the invention. The cross-sectional area of these chambers 38 will, of course, effect efficient encapsulation because in accordance with known laws, the viscosity of a given liquid is a limitation not only to its rate of flow but, also, to its ability to bridge a cross-sectional area. Generally, we prefer to select a vertical chamber or column former 38 which defines a column having a cross-sectional area which responds to a formula in which the length of the perimeter wetted by a liquid therein, expressed in inches, multiplied by the maximum distance, expressed in inches, between two points in the area produces a number less than 0.6. In our preferred practice, using water in the encapsulating liquid, we prefer dimensions which when multiplied as above produce a number of about 0.12.

It will be apparent to those skilled in the art that by suitable arrangement the energy of gas mixtures passing between the evaporator and the condenser as, for instance, through the passage 30 as shown in FIG. 1 may be converted, through known turbine arrangements, to power which may be applied to the process at hand or for other purposes.

It will be appreciated from the foregoing description of the methods of the invention and of the preferred procedural conditions thereof that it may be applied in various specific ways which are adapted to the environment of application, the purpose of the purification of the water and similar factors.

I claim:

1. In a distillation type system for the production of discrete quantities of a utilizable fresh water product from an externally available source of saline water the steps of
    (1) continously evaporating a portion of a supply of saline water at less than atmospheric pressure to produce a gaseous mixture containing water vapor and noncondensible components,
    (2) continuously replenishing said supply of saline water by introduction of fresh saline water from said externally available source thereof,
    (3) continuously removing unevaporated portions of of said saline water from said supply;
    (4) initially condensing a substantial portion of said water vapor from said gaseous mixture to produce a discrete readily-removable fresh water condensate,
    (5) continuously removing portions of said discrete fresh water condensate from the locus of condensation thereof to provide a discrete immediately utilizable fresh water product,
    (6) continuously encapsulating, essentially in liquid, bodies of the non-condensible components and the residual water vapor of said gaseous mixture in the upper extremities of a multiplicity of elongate substantially vertical chambers in such manner that the horizontal cross section of such bodies at the time of their encapsulation and during an early portion of their subsequent downward displacement is substantially equal in area and dimension to the horizontal cross section of the chambers in which they were formed, said horizontal cross section of the said chambers having a horizontal cross-sectional area of such character that the product of the length in inches of the wetted perimeter thereof and the maximum distance in inches between any two points thereon has a numerical value of less than 0.6,
    (7) selectively imparting downward displacement and concurrent compression of said encapsulated bodies within the upper portions of said chambers by the weight of liquid defining subsequently encapsulated bodies disposed thereabove to provide an effluent deliverable from the lower portions thereof,
    (8) releasing the effluent from said multiplicity of chambers into a confined common stream having a flow velocity that is relatively high compared to the rate of flow of liquid through said chambers and is of a magnitude to effect displacement of said effluent and any gas bodies contained therein away from said chambers and transfer thereof to a location external of the locus of evaporation,
    (9) and maintaining the temperature of the encapsulating liquid below the condensation point of the water vapor contained within said encapsulated bodies to effect substantial condensation thereof during the downward displacement of said bodies.

2. The method as set forth in claim 1 wherein said product of the length in inches of the wetted perimeter of the horizontal cross section of said chambers and the maximum distance in inches between any two points thereon has a numerical value of about 0.12.

3. The method as set forth in claim 1 including the step of releasing said encapsulating liquid and any uncondensed gas bodies disposed therein from said stream and returning at least a substantial portion of said encapsulating liquid to the upper extremities of said chambers to effect encapsulation of further of said bodies.

References Cited

UNITED STATES PATENTS

| | | | |
|---|---|---|---|
| 3,344,584 | 10/1967 | Kehoe et al. | 55—46 |
| 3,385,768 | 5/1968 | Yost | 203—26 |
| 3,394,055 | 7/1968 | Ludwig | 203—10 |
| 1,547,893 | 7/1925 | Bergius | 203—100 X |
| 1,204,300 | 11/1916 | Moore | 203—11 X |
| 1,626,960 | 5/1927 | Oliver | 203—10 X |
| 2,006,985 | 7/1935 | Claude et al. | 203—10 X |
| 2,160,394 | 5/1939 | Weaver | 62—475 |
| 2,367,708 | 1/1945 | Anderson | 62—475 |
| 2,384,860 | 9/1945 | Thomas | 62—475 X |
| 3,232,847 | 2/1966 | Hoff | 203—11 |

FOREIGN PATENTS 575,860   4/1958   Italy.

NORMAN YUDKOFF, Primary Examiner

F. E. DRUMMOND, Assistant Examiner

U.S. Cl. X.R.

55—46; 202—185; 203—11, 26